TRANSMISSION SYSTEM FOR THE TRANSMISSION OF SIGNALS

Filed Aug. 23, 1968

3 Sheets-Sheet 1

PRIOR ART FIG. 1

INVENTOR.
JASPER H. DUIMELAAR

BY

[signature]

AGENT

Oct. 20, 1970 J. H. DUIMELAAR 3,535,474

TRANSMISSION SYSTEM FOR THE TRANSMISSION OF SIGNALS

Filed Aug. 23, 1968 3 Sheets-Sheet 2

INVENTOR.
JASPER H. DUIMELAAR

BY

Frank R. Trifari

AGENT

TRANSMISSION SYSTEM FOR THE TRANSMISSION OF SIGNALS

Filed Aug. 23, 1968 3 Sheets-Sheet 3

INVENTOR.
JASPER H. DUIMELAAR
BY
Frank R. Trifari
AGENT 3,535,474

TRANSMISSION SYSTEM FOR THE TRANSMISSION OF SIGNALS

Jasper Hendrik Duimelaar, Hilversum, Netherlands, assignor, by mesne assignments, to U.S. Philips Corporation, New York, N.Y., a corporation of Delaware Filed Aug. 23, 1968, Ser. No. 754,938
Claims priority, application Netherlands, Aug. 25, 1967, 6711758
Int. Cl. H04b 3/44
U.S. Cl. 179—170 3 Claims

ABSTRACT OF THE DISCLOSURE

A repeater system is disclosed wherein power is supplied via supply current by-pass lines including separation filters. The current supply loop is provided with sockets for connecting an auxiliary supply current source and for establishing cross-connections between the forward and return branch of the supply loop. A diode is used to properly direct the auxiliary current.

The invention relates to a transmission system for the transmission of signals along a plurality of parallel transmission lines including repeater stations, a main supply current source for the supply of the repeater stations being connected to a current supply loop having a forward and a return branch, successive sections of the transmission lines forming part of said branches, which sections are connected together through supply current by-pass lines including separation filters, the current supply loop being furthermore provided with sockets for connecting an auxiliary supply current source and for establishing cross connections between the forward and the return branch of the current supply loop. The parallel transmission lines are particularly located within the sheath of a transmission cable.

In such transmission systems in which the repeater stations are supplied through the transmission lines steps must always be taken in practice to ensure the safety of the operating personnel as much as possible in case of repairs. In addition to a limitation of the supply voltage to, for example, 300 v. relative to earth and of the supply current to, for example, 50 ma. it is also necessary to this end that it must be possible to completely eliminate the supply voltages on a disturbed section in a transmission cable during repairs and to connect it to earth without interrupting the operation of the undisturbed transmission lines in the disturbed cable section.

It has already been suggested to satisfy the said requirement by applying special switching facilities for each repeater station which facilities are provided with switches to which a plurality of points of the supply current by-pass lines is connected through wiring led from the repeater units to the exterior. After connection of the auxiliary supply source the current circuits of main supply source and auxiliary supply source are separated with the aid of this special switching facility by switching simultaneously and within a very short time corresponding switches in the forward and return branches of the current supply loop and subsequently the cross-connections between the forward and the return branches are formed for obtaining a cable section completely free from supply voltages and connected to earth. This suggestion has, however, the practical difficulty that the special switching facility is found to be particularly complicated and expensive, inter alia, due to the high cross-talk requirements set to the repeater units in the same repeater station while in addition short interruptions of supply circuits may occur during switching which are especially troublesome in telegraphy transmission.

An object of the invention is to provide a different conception of a transmission system of the kind mentioned in the preamble in which a cable section completely free from supply voltages and connected to earth is obtained in a surprisingly simple manner without interrupting the operation of the undisturbed transmission lines in this cable section and without drastically modifying repeater units and repeater stations and without influencing the transmission system and the associated auxiliary facilities such as, for example, level control and fault-location equipment in their normal operating conditions.

The transmission system according to the invention is characterized in that a supply current by-pass line includes a direction-dependent current coupling which is formed by a diode located between the separation filters and a socket connected in series therewith for connection of the auxiliary supply current source, said diode having its pass-direction in the direction of the main supply current and at connecting the auxiliary supply current source to the socket located behind the diode in the said current direction causing the auxiliary supply current supplied thereto to flow exclusively in the direction of the main supply current.

In order that the invention may be readily carried into effect, it will now be described in detail by way of example with reference to the accompanying diagrammatic drawings in which:

FIG. 2 shows a transmission system according to the invention for carrier telephony transmission, while

Figure 1:
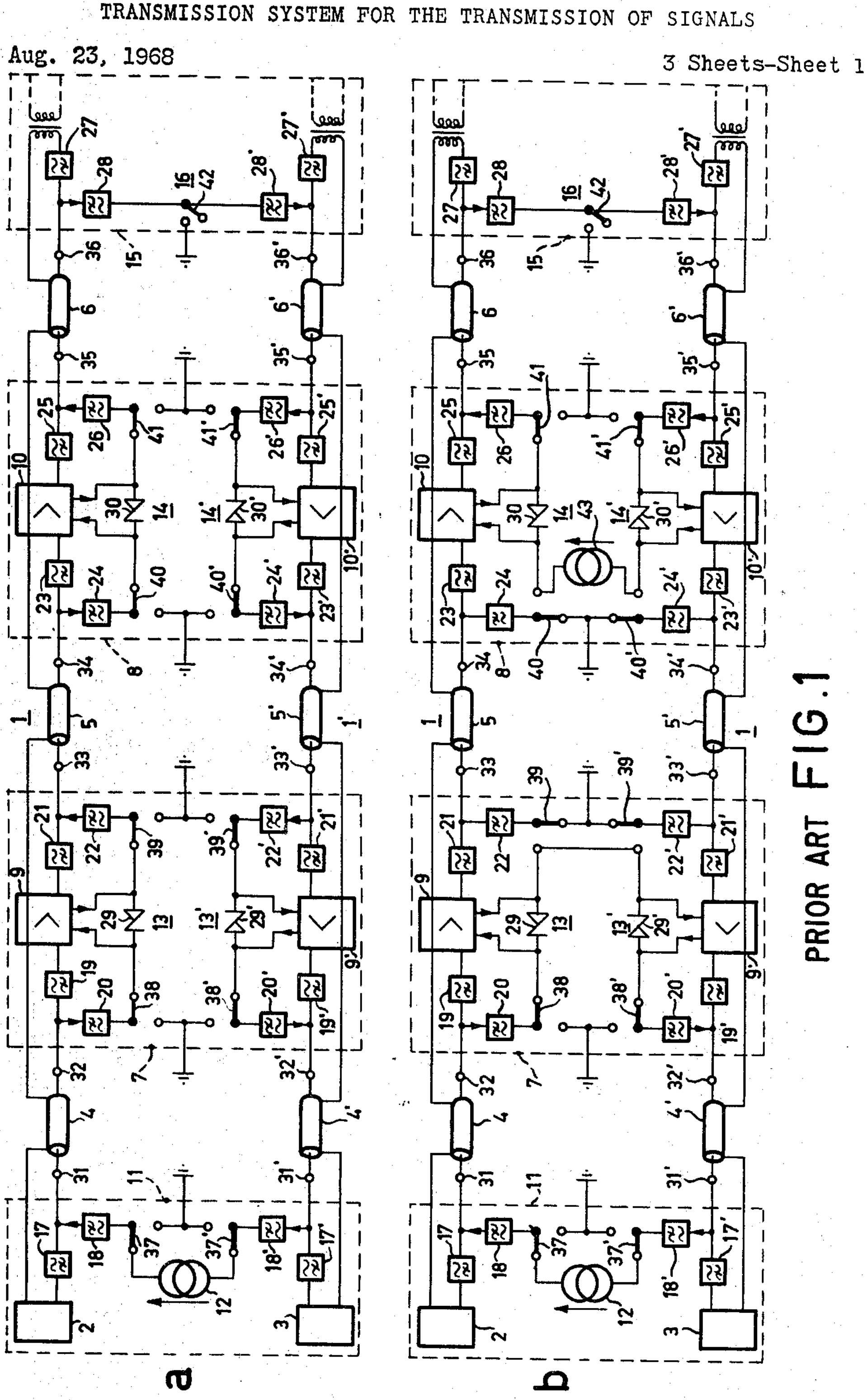
FIG. 1 shows a known transmission system for carrier telephony transmission.

FIG. 1 shows at *a* a known carrier telephony system for signal transmission in two traffic directions along a plurality of parallel coaxial transmission lines within the sheath of one buried transmission cable in which, for example, 1200 speech signals in the frequency band of 60–6200 kc./s. are transmitted in one traffic direction through each coaxial transmission line within said transmission cable. The practical embodiment of the carrier telephony system comprises six carrier telephony connections which are, however, mutually equal of structure so that for the sake of clarity the figure illustrates only two carrier telephony connections 1, 1'. The traffic in the forward direction takes place from the first terminal station 2 along the carrier telephony connection 1 and the traffic in the return direction towards the final terminal station 3 takes place along the carrier telephony connection 1' the elements of which corresponding to carrier telephony connection 1 are indicated by the same reference numerals but provided with indices.

The carrier telephony connections 1, 1' are provided with repeater stations 7, 8 between the coaxial transmismision line sections 4, 5, 6 and 4', 5', 6', respectively, including intermediate repeaters 9, 10 and 9', 10', respectively. In the practical embodiment of the carrier telephony system shown the number of repeater stations is approximately 20 but for the sake of simplicity only two repeater stations 7, 8 are shown in the figure; the distance between the repeater stations is approximately 3 km.

The D.C. current supply of the repeater stations 7, 8 is effected through the coaxial transmission lines from a main station 11, in which the first terminal station 2 and the final terminal station 3 are incorporated. To this end a main current supply source 12 is connected to a current supply loop the forward branch of which is formed by the inner conductors of the coaxial line sections 4, 5, 6 and the return branch of which is formed by the inner conductors of the coaxial line sections 4', 5', 6'. The inner conductors of the line sections 4, 5, 6 and 4', 5', 6', respectively are connected together in the repeater stations 7, 8 through supply current by-pass lines 13, 14 and 13', 14', respectively, the forward and the return branches of the current supply loop in a supply loop station 15 also being connected together through a current supply by-pass line 16. To separate the carrier telephony signals and the D.C. supply current the main station 11 includes the separation filters 17, 18 and 17', 18', respectively, the repeater stations 7, 8 include the separation filters 19, 20, 21, 22; 23, 24, 25, 26 and 19', 20', 21', 22'; 23', 24', 25', 26', respectively and the supply loop station 15 includes the separation filters 27, 28 and 27', 28', respectively. The separation filters for selection of the carrier telephony signals are formed by the high-pass filters 17, 19, 21, 23, 25, 27 and 17', 19', 21', 23', 25', 27', respectively, while the separation filters for the D.C. supply current are formed by the low-pass filters 18, 20, 22, 24, 26, 28 and 18', 20', 22', 24', 26', 28', respectively, incorporated in the supply current by-pass lines 13, 14 and 13', 14', respectively.

Series supply is used in the carrier telephony system shown in which the D.C. supply current for the intermediate repeaters 9, 10 and 9', 10' is derived from Zener diodes 29, 30 and 29', 30' in the supply current by-pass lines 13, 14 and 13', 14'. The Zener diodes 29, 30; 29', 30' do not convey current in the normal operating condition but in case of a defect in an intermediate repeater or when removing an intermediate repeater for inspection the relevant Zener diode starts to convey current so that the various repeater stations of the carrier telephony system can be inspected without interruption of the current supply loop.

Furthermore sockets 31, 32; 33, 34; 35, 36 and 31', 32'; 33', 34'; 35', 36', respectively, are provided near the ends of the coaxial line sections 4, 5, 6 and 4', 5', 6', respectively, in order to be able to measure these line sections in an easy and quick manner.

If in the carrier telephony system a disturbance occurs in a section of the transmission cable between two repeater stations it is of paramount importance from a point of view of safety for the operating personnel that the undisturbed transmission lines are also fully free from supply voltages during the repair in this disturbed cable section and that the inner conductors are connected to earth for low-frequencies without the traffic in the undisturbed transmission lines in the disturbed cable section being interrupted.

To this end the known carrier telephony system of FIG. 1 includes switching facilities which permit in combination with an auxiliary supply source of obtaining such a cable section free from supply voltages and connected to earth. The switching facilities particularly consist of switches 37, 37'; 38, 38'; 39, 39'; 40, 40'; 41, 41'; 42 having earthed contacts which switches are provided in the main station 11, the repeater stations 7, 8 and in the supply loop station 15, four points of the supply current by-pass lines 13, 14; 13', 14' of each intermediate repeater 9, 10; 9', 10' being led through separate wiring to the exterior and connected to contacts of the switches 38–41; 38'–41'.

If, for example, one of the transmission lines in the cable section including the line sections 5, 5' is disturbed the feeding voltage on these line sections 5, 5' is eliminated and connected to earth for low frequencies as follows (compare *b* in FIG. 1). In the repeater station 8 the contacts of the switches 40, 40' in the supply current by-pass lines 14, 14' are connected to the terminals of an auxiliary supply current source 43. Subsequently the switches 40, 40' are simultaneously switched within a very short time so that the inner conductors of the line sections 5, 5' are connected together and connected to earth for low-frequencies. The main supply is then effective up to the repeater station 8 and the auxiliary supply feeds the repeater station 8 and following stations. A short circuit is then provided in the repeater station 7 at the switches 39, 39' between the contacts in the supply current by-pass lines 13, 13' so that the feeding voltage on the line sections 5, 5' is eliminated for low-frequencies and finally the switches 39, 39' are switched so that the inner conductors of the line sections 5, 5' are also connected to earth for low-frequencies on the side of the repeater station 7, so that stray currents originating from, for example, neighbouring high-voltage cables cannot induce voltages in the line sections 5, 5'. The main supply is now effective up to and including repeater station 7 and the auxiliary supply feeds the repeater station 8 and following stations.

To obtain a cable section free from supply voltages and connected to earth in the known transmission system it is thus required for each intermediate repeater to lead four points from the actual repeater unit to the exterior by means of separate wiring and to use two special switches which are adapted to have a high switching speed, for example, 1 msec. at comparatively high supply voltages, for example, up to 500 v. and supply currents, for example, up to 50 ma., while furthermore the switches in the forward and return branches of the current supply loop must be mechanically coupled in pairs for simultaneous operation. In addition special requirements must be set to the construction of both filters and wiring and switches in order to meet the required cross-talk attenuation of approximately 150 db between the output of an intermediate repeater for the one traffic direction and the input of an intermediate repeater for the other traffic direction.

Figure 2:
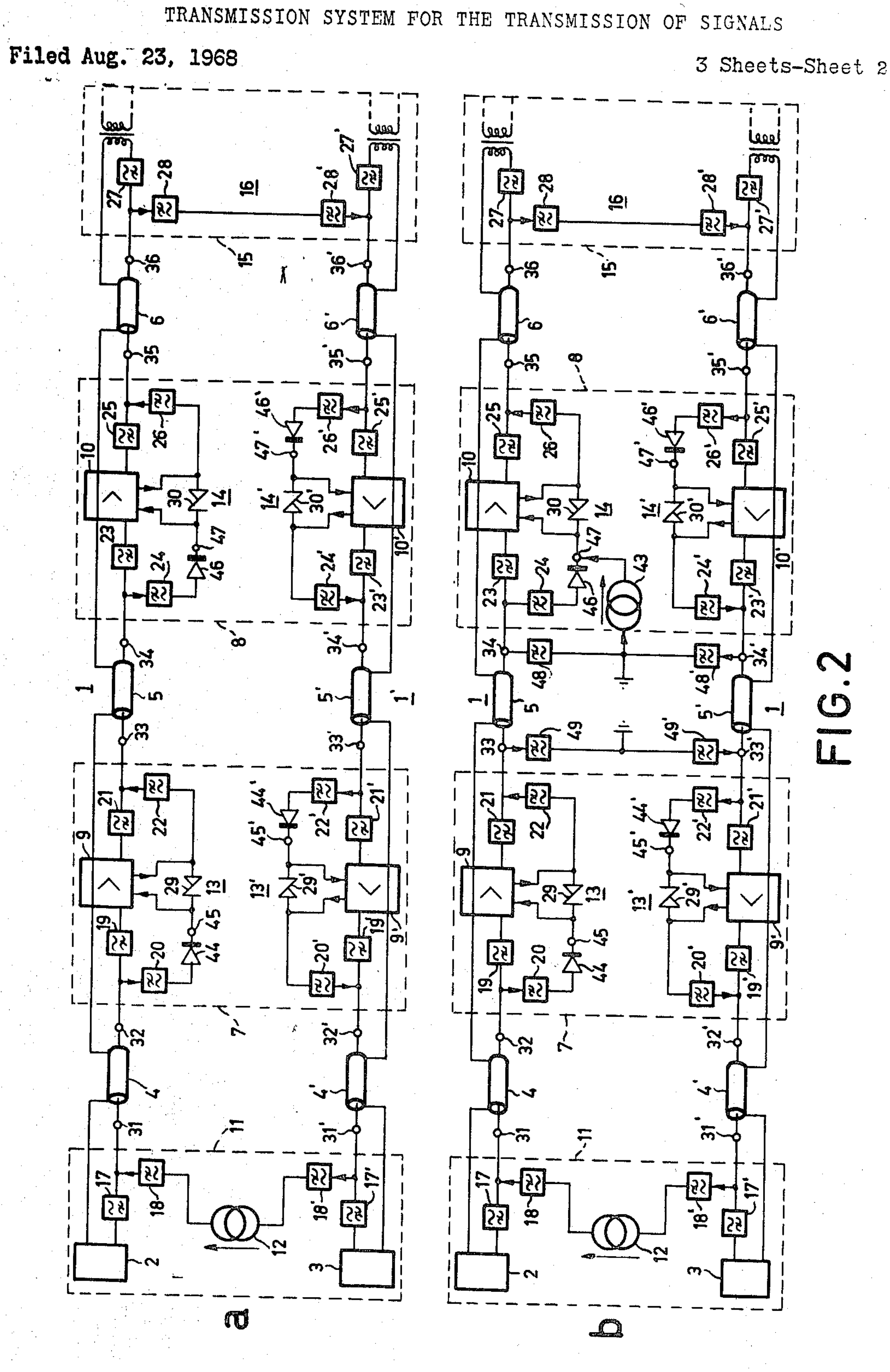
Figure 3:
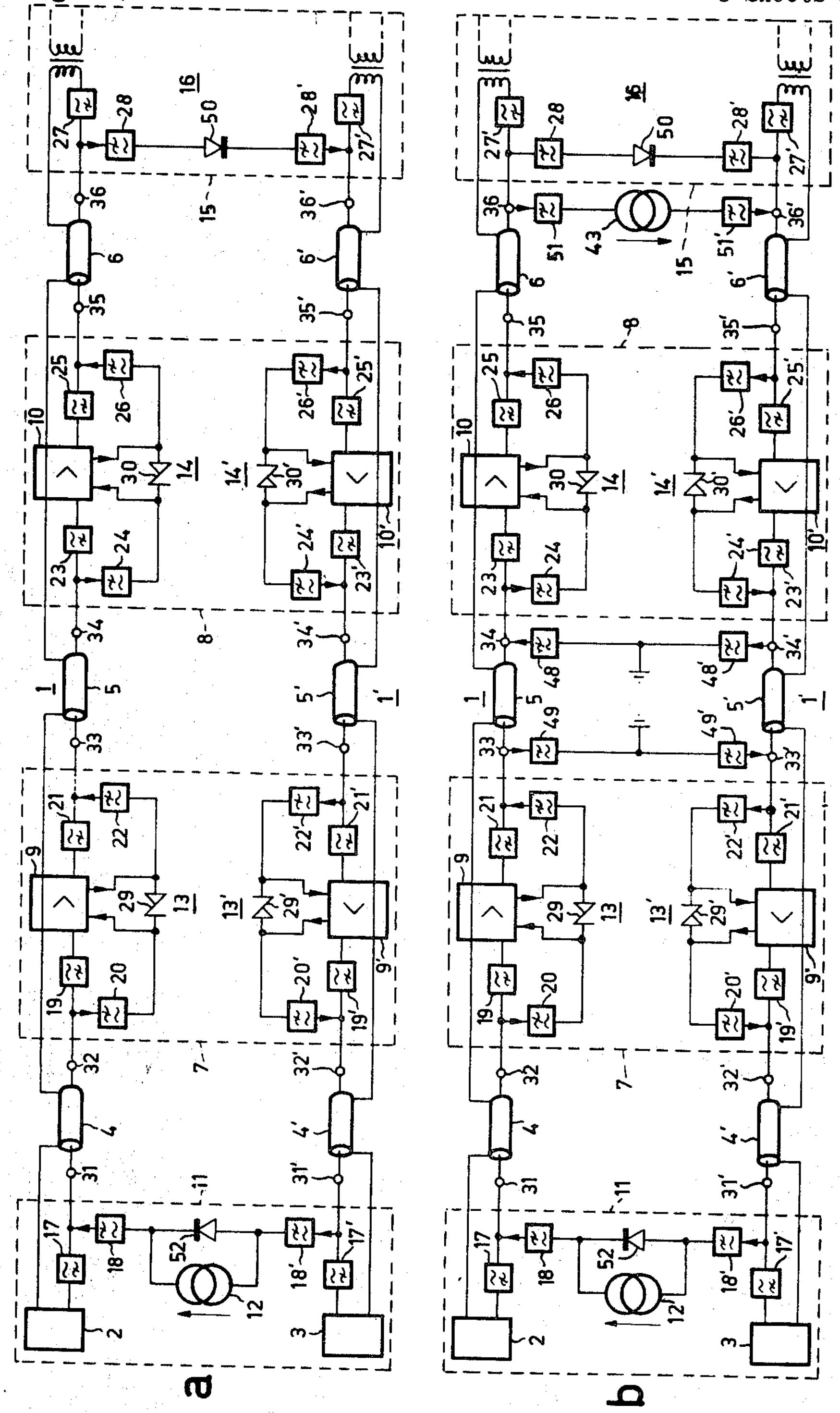
FIG. 3 shows a modification of the transmission system of FIG. 2 which is advantageous in practice.

In the transmission system according to the invention a completely different way has been chosen along which the number of points to be led to the exterior is drastically reduced for each intermediate repeater, the use of special switching equipment is fully avoided and in spite of this a cable section free from supply voltages and connected to earth is obtained in a surprisingly simple manner without interrupting the normal operation of the undisturbed transmission lines in this cable section as will now be illustrated with reference to the carrier telephony systems in FIGS. 2 and 3 according to the invention. Elements corresponding to those in FIG. 1 are indicated by the same reference numerals in FIGS. 2 and 3.

Particularly in the transmission system according to the invention a direction-dependent current coupling is incorporated in a supply current by-pass line which coupling is formed by a diode located between the separation filters and a socket connected in series therewith for connection of the auxiliary supply current source, said diode having its pass-direction in the direction of the main supply current and at connecting the auxiliary supply current source to the socket located behind the diode in the said current direction causing the auxiliary supply current supplied to the socket to flow exclusively in the direction of the main supply current.

In the embodiment shown at *a* in FIG. 2 a direction-dependent current coupling is incorporated in the supply current by-pass line 13, 14; 13', 14' for each intermediate repeater 9, 10; 9', 10' by applying the series arrangement of a diode 44, 46; 44', 46' passing the main supply current and a subsequent socket 45, 47; 45', 47' for connection of an auxiliary supply current source after the separation filter 20, 24, 20', 24' and preceding the supply input of the intermediate repeater 9, 10; 9', 10' viewed in the direction of the main supply current.

If in the carrier telephony system described a disturbance occurs, for example, in one of the transmission lines in the cable section including the line sections 5, 5' then the positive terminal of an auxiliary supply current source 43 in the repeater station 8 is connected to the socket 47 in the supply current by-pass line 14 and the negative terminal is connected through a low-pass filter 48' to the socket 34' at the end of the line section 5'. The auxiliary supply current source 43 superimposes its current supplied to the socket 47 on the main supply current already present in the supply current loop, the diode 46 preventing the auxiliary supply current from flowing in a direction opposite to that of the main supply current, while the Zener diodes 30, 30' limit the supply voltage for the intermediate repeaters 10, 10'. Subsequently the inner conductors of the line sections 5, 5' are through-connected for low frequency and connected to earth by applying cross-connections between the sockets 34, 34' and 33, 33' on either side of the line sections 5, 5' which cross-connections consist of two low-pass filters 48, 48' and 49, 49' in series and by connecting to earth the junction of the series-arranged filters 48, 48' and 49, 49' in these cross-connections. The inner conductors of the line sections may now be through-connected and connected to earth in an arbitrary sequence. The main supply is now effective up to and including the repeater station 7 and the auxiliary supply feeds the repeater station 8 and the following stations while the line sections 5, 5' are free from supply voltages and are connected to earth for low frequencies (compare *b* in FIG. 2).

By using the steps according to the invention a considerable simplification is thus obtained. Particularly now for each intermediate repeater only one point of the supply current by-pass line needs to be led to the exterior and the use of special switching equipment for each intermediate repeater is wholly superfluous so that the cross-talk requirements can comparatively easily be satisfied while in addition a cable section free from supply voltages and connected to earth for low frequencies is obtained in a simpler manner without influencing the transmission system and the associated auxiliary equipment such as level control and fault-location equipment in their normal operating conditions.

While the embodiment of the transmission system of FIG. 2 requires for each intermediate receiver the incorporation of a diode in the supply current by-pass line and leading a point thereof to the exterior, the modification shown in FIG. 3 of the carrier telephony system of FIG. 2 does not require any additional provisions, neither in the intermediate repeaters nor in the repeater stations.

In the embodiment of the carrier telephony system according to the invention shown at *a* in FIG. 3 only a direction-dependent current coupling is incorporated in the supply current by-pass line 16 in the supply loop station 15 having the form of a diode 50 passing the main supply current and located between the separation filters 28, 28' and the socket 36' outside the separation filters 28, 28' and located behind the diode 50 in the direction of the main supply current which socket is used for connection of the auxiliary supply current source.

If in this transmission system one of the transmission lines in the cable section including the line sections 5, 5' is disturbed the positive terminal of the auxiliary supply current source 43 at the supply loop station 15 is connected through a low-pass filter 51' to the socket 36' and the negative terminal is connected through a low-pass filter 51 to the socket 36. As in FIG. 2 the auxiliary current source 43 also superimposes its current supplied to socket 36' on the main supply current in the current supply loop, the diode 50 preventing the auxiliary supply current in the supply current by-pass line 16 from flowing in a direction opposite to that of the main supply current and the auxiliary supply current source 43 being short-circuited. Subsequently the cross-connections in the forms of the low-pass filters 48, 48' and 49, 49' are applied in identical manner as in FIG. 2 on either side of the line sections 5, 5' between their inner conductors and the junctions of the filters 48, 48', 49, 49' are connected to earth, it also being allowed to through-connect and connect to earth in an arbitrary sequence. The main supply is now effective up to and including repeater station 7, the auxiliary supply is effective up to and including repeater station 8 and the line sections 5, 5' are free from supply voltages and are connected to earth for low frequencies (compare *b* in FIG. 3).

While maintaining the advantages already mentioned in the transmission system of FIG. 2 a cable section free from supply voltages and connected to earth in the transmission system of FIG. 3 is obtained without modifications of the construction of intermediate repeaters and repeater stations, only a diode in the supply loop station being incorporated in the supply current by-pass line and furthermore exclusive use being made of the sockets on the ends of the coaxial cable sections which sockets are always present in the repeater stations for purposes of measuring.

It is noted that in the transmission system of FIG. 3 the main supply current source 12 is shunted by a diode 52 which does not influence the normal supply. It is thus achieved that the current circuit 18', 52, 18 in the main station 11 and the current circuit 28, 50, 28' in the supply loop station 15, which current circuits connect together the forward and return branches of the supply loop, are equal to each other. This step has the advantage that in practice in which the coupling transformers form a constructive unit together with the separation filters for the supply current and the carrier telephony signals, a symmetrical structure of this constructive unit is obtained which as a result can be used in all main stations and supply loop stations.

What is claimed is:

1. A transmission system for the transmission of signals along a plurality of parallel transmission lines including repeater stations, a main supply current source for the supply of the repeater stations being connected to a current supply loop having a forward and a return branch, successive sections of the transmission lines forming part of said branches, which sections are connected together through supply current by-pass lines including separation filters, the current supply loop being furthermore provided with sockets for connecting an auxiliary supply current source and for establishing cross-connections between the forward and the return branch of the current supply loop, characterized in that a direction-dependent current coupling is included in a supply current by-pass line which coupling is formed by a diode located between the separation filters and a socket connected in series therewith for connection of the auxiliary supply current source, said diode having its pass-direction in the direction of the main supply current and at connecting the auxiliary supply current source to the socket located behind the diode in the said current direction causing the auxiliary supply current supplied thereto to flow exclusively in the direction of the main supply current.

2. A transmission system as claimed in claim 1, characterized in that in a repeater station the series arrangement of the diode and the socket for connection of the auxiliary supply current source is incorporated between the separation filters in the supply current by-pass line.

3. A transmission system as claimed in claim 1, characterized in that in a supply loop station in which the forward and return branches of the current supply loop are through-connected to a supply current by-pass line the diode is incorporated between the separation filters and the socket for connection of the auxiliary supply current source is incorporated outside the separation filters.

References Cited

UNITED STATES PATENTS 2,020,318 11/1935 Jacobs.
2,037,183 4/1936 Strifby.

KATHLEEN H. CLAFFY, Primary Examiner
W. A. HELVESTINE, Assistant Examiner